United States Patent
Bookbinder et al.

(10) Patent No.: US 11,198,635 B2
(45) Date of Patent: Dec. 14, 2021

(54) HALOGEN-DOPED SILICA PREFORMS FOR OPTICAL FIBERS

(71) Applicant: CORNING INCORPORATED, Corning, NY (US)

(72) Inventors: Dana Craig Bookbinder, Corning, NY (US); Steven Bruce Dawes, Corning, NY (US); Richard Michael Fiacco, Corning, NY (US); Brian Lee Harper, Painted Post, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 99 days.

(21) Appl. No.: 16/529,123

(22) Filed: Aug. 1, 2019

(65) Prior Publication Data
US 2020/0048136 A1    Feb. 13, 2020

Related U.S. Application Data

(60) Provisional application No. 62/715,947, filed on Aug. 8, 2018.

(51) Int. Cl.
*C03C 3/06* (2006.01)
*C03B 37/014* (2006.01)

(52) U.S. Cl.
CPC ........ *C03B 37/01446* (2013.01); *C03C 3/06* (2013.01); *C03B 2201/07* (2013.01);
(Continued)

(58) Field of Classification Search
CPC . C03B 37/01446; C03B 2201/20; C03C 3/06; C03C 2201/08; C03C 2201/11; C03C 2203/54
See application file for complete search history.

(56) References Cited

U.S. PATENT DOCUMENTS 9,594,210 B2 *   3/2017   Bookbinder ...... C03B 37/01453
9,594,212 B2     3/2017   Bookbinder et al.
(Continued)

FOREIGN PATENT DOCUMENTS

EP    3473603 A1     4/2019
JP    2017-154934 A  9/2017
(Continued)

OTHER PUBLICATIONS

Invitation to Pay Additional Fees of the International Searching Authority; PCT/US2019/044351; dated Oct. 14, 2019; 15 PGS.
(Continued)

*Primary Examiner* — Noah S Wiese
(74) *Attorney, Agent, or Firm* — Kevin L. Bray

(57) ABSTRACT

Preparation of halogen-doped silica is described. The preparation includes doping silica with high halogen concentration and sintering halogen-doped silica to a closed-pore state in a gas-phase environment that has a low partial pressure of impermeable gases. Impermeable gases are difficult to remove from halogen-doped fiber preforms and lead to defects in optical fibers drawn from the preforms. A low partial pressure of impermeable gases in the sintering environment leads to a low concentration of impermeable gases and a low density of gas-phase voids in densified halogen-doped silica. Preforms with fewer defects result.

13 Claims, 6 Drawing Sheets

(52) U.S. Cl.
CPC ...... *C03B 2201/20* (2013.01); *C03C 2201/08* (2013.01); *C03C 2201/11* (2013.01); *C03C 2203/54* (2013.01)

(56) References Cited

U.S. PATENT DOCUMENTS

| | | | |
|---|---|---|---|
| 9,618,692 B2* | 4/2017 | Berkey | ............. C03B 37/01453 |
| 2003/0079504 A1 | 5/2003 | Boek et al. | |
| 2016/0299289 A1* | 10/2016 | Bookbinder | ....... G02B 6/03694 |
| 2016/0304392 A1* | 10/2016 | Bookbinder | ......... G02B 6/0288 |
| 2019/0154911 A1 | 5/2019 | Bookbinder et al. | |

FOREIGN PATENT DOCUMENTS

| | | | |
|---|---|---|---|
| JP | 2017154935 A | 9/2017 | |
| WO | 03/37810 A1 | 5/2003 | |
| WO | 2017003982 A2 | 1/2017 | |

OTHER PUBLICATIONS

International Search Report and Written Opinion of the European International Searching Authority; PCT/US2019/044351; dated Jan. 15, 2020; 19 PGS.

* cited by examiner

HALOGEN-DOPED SILICA PREFORMS FOR OPTICAL FIBERS

This application claims the benefit of priority to U.S. Provisional Application Ser. No. 62/715,947 filed on Aug. 8, 2018, the content of which is relied upon and incorporated herein by reference in its entirety.

FIELD

This description relates to optical fiber preforms doped with halogens and methods of making such preforms. More particularly, this description relates to preforms for optical fibers made from silica that include high concentrations of halogen doping and low internal gas void volume.

BACKGROUND

Optical fiber performance depends on the ability to control refractive index profiles in low loss fiber media. Most typically, silica glass is used as the base medium for optical fibers used to transmit light over lengths ranging from several meters to hundreds of kilometers. Silica is a preferred base medium because it exhibits low attenuation in the 1300 nm to 1600 nm wavelength range commonly used to transmit optical signals. Attenuation loss in silica-based optical fibers is as low as 0.18 dB/km at 1550 nm for single-mode optical fiber. Optical loss is determined by the Rayleigh scattering of the silica-based medium, the concentration of impurities, and wavelength dependent factors such as UV and IR absorption tails.

Optical fibers include a central glass core surrounded by a glass cladding. The base glass medium for the core and cladding is typically silica. To achieve waveguiding, the core is configured to have a higher refractive index than the cladding. The refractive index of silica can be modified by doping. Various dopants are known that either increase ("updopants") or decrease ("downdopants") the refractive index of silica relative to undoped silica. In most single-mode silica fibers, germanium dioxide ($GeO_2$) is used to dope the core region. $GeO_2$ doping levels are typically adjusted to provide an increase in the relative refractive index of 0.35%. Although $GeO_2$ is a relatively expensive dopant, it comprises only about 8% by weight (wt %) of the core region of the fiber and only about 0.5 wt % of the total glass fiber (core+cladding). Germanium doping is also relatively easy to accomplish during laydown of silica soot and complex refractive index profiles can be made simply by varying the ratio of silicon and germanium precursors supplied to the deposition system during the laydown process (typically an OVD (outside vapor deposition) silica soot deposition process). $SiCl_4$ and $GeCl_4$ are common precursors for forming Ge-doped silica glass in the preform laydown process. A drawback of using $GeO_2$ as an updopant for silica cores is that the presence of Ge increases the Rayleigh scattering of the fiber relative to pure silica fibers. As a result, there is interest in identifying alternate dopants that enable the refractive index profile control of silica needed in optical fibers to achieve fibers with low Rayleigh scattering and efficient waveguiding at reasonable cost.

Two approaches for producing ultralow loss fibers have been have been commercialized. In one approach, a silica core is modified by alkali doping at low concentration (e.g. 0.1 wt % $K_2O$ or less). The alkali doping concentration is designed to be (1) high enough to reduce Rayleigh scattering by lowering the viscosity of the glass to a degree sufficient to produce a fiber core with a low fictive temperature and (2) sufficiently low to avoid increases in Rayleigh scattering resulting from compositional inhomogeneities. Since alkali doping at low concentration does not lead to a significant increase in the refractive index of the core relative to undoped silica, the refractive index profile is controlled by doping a surrounding silica cladding with F (fluorine). The presence of fluorine in the silica cladding reduces the refractive index of the cladding relative to undoped silica and provides a mechanism for achieving the core-cladding refractive index contrast needed for effective waveguiding in an optical fiber. The process required to make fibers with alkali-doped cores is complicated and expensive, but attenuation of ~0.15 dB/km over selected wavelengths in the 1300 nm-1500 nm range is possible.

A second approach to making lower loss fiber is to use Cl (chlorine) as a dopant in the core. Since chlorine doping can be accomplished in the consolidation step of preform fabrication, process variables (e.g. preform size, silica precursor) affecting costs associated with core fabrication can be re-optimized. The presence of Cl in the core, even at concentrations >1 wt % Cl, does not strongly influence the contribution of compositional inhomogeneity to Rayleigh scattering and fibers with Cl-doped cores exhibit low losses due to Rayleigh scattering. Regarding control of the refractive index profile, data indicate that the addition of 1 wt % Cl to the core increases the relative refractive index by about 0.063%. Since a higher core index relative to undoped silica is preferred for efficient waveguiding, proper control of the refractive index profile requires doping of the cladding with a dopant that decreases the relative refractive index. Fiber with Cl-doped silica cores using $SiCl_4$ as the dopant precursor typically include silica cladding doped with about 0.5 wt %-1.5 wt % F (fluorine) to achieve the proper differential in core-cladding refractive index needed for efficient waveguiding. A fiber with a Cl-doped silica core and an F-doped silica clad exhibits attenuation losses of 0.17 dB/km or lower at 1550 nm.

Doping of the silica cladding with F is a cost-intensive step that would be desirable to eliminate. The need for F-doping of the cladding reflects a limitation in the maximum doping concentration of the core silica glass with Cl using conventional Cl doping processes. Under typical commercial process conditions, Cl doping of silica is limited to about 2.3 wt %. The relative refractive index increases associated with doping of a silica core with 2.3 wt % Cl is insufficient relative to an undoped silica glass cladding to provide the core-cladding index differential desired for efficient waveguiding in an optical fiber. As a result, the cladding is doped with F to lower the cladding index to achieve the preferred core-cladding index differential. It would be preferable to achieve a core Cl doping concentration high enough to achieve a sufficiently high core-cladding index using undoped silica or lightly F-doped silica for the cladding.

Efforts are underway to further increase Cl doping levels in the core, but have been limited by practical considerations of process equipment. Current preform fabrication processes are run in furnaces that are equipped to supply vapor phase constituents at atmospheric pressure or less. Cl doping of silica using $SiCl_4$, or other silicon chloride species, appears to show a thermodynamic equilibrium that limits the concentration of Cl ([Cl]) incorporated in silica to an amount consistent with the empirical relation: [Cl](wt %)=$2.3*P_{SiCl4}^{1/4}$, where $P_{SiCl4}$ is the partial pressure (in units of atmosphere) of the Cl-doping precursor ($SiCl_4$) over the glass. As a result, in a process with a maximum pressure of 1 atmosphere, the highest attainable Cl doping concentration in silica is 2.3 wt %. The relative refractive index increase relative to undoped silica for 2.3 wt % Cl doping is only about Δ=0.15%, which is insufficient to achieve fibers having adequate effective area and low bend losses when undoped silica is used as the cladding material. F-doping of the cladding is thus needed to increase the core-cladding index differential. Cl doping levels of at least 5.0 wt % are needed to achieve a core refractive index sufficiently high to obviate the need for fluorine doping of the cladding and to permit the use of undoped silica as a cladding material.

Predicted process pressures for Cl doping well above atmospheric pressure are needed to achieve Cl doping concentrations that are sufficiently high to permit use of undoped silica as a cladding material. Doping of silica with a Cl precursor at pressures greater than 2.0 atm, or greater than 3.0 atm., or greater than 5.0 atm, or greater than 10 atm, or greater than 20 atm, or greater than 40 atm are needed to achieve high Cl doping concentrations (e.g. greater than 3 wt %, or greater than 4 wt %, or greater than 5 wt %).

At the high pressures needed to obtain high levels of doped chlorine in glass, the presence of low permeability gases (e.g. one or more of He, Ne, Ar, Kr, Xe, $Cl_2$, $Br_2$, $O_2$, $SO_2$, $N_2$, CO, $CO_2$, and HCl) result in gas-phase voids that lead to a deterioration in the core cane product formed in the redraw process. The deterioration in glass quality due to void formation is intensified at the high-pressure conditions needed to achieve high Cl doping concentrations because the concentration of low permeability gases is increased under high pressure conditions and because sealed furnaces are required to maintain high process pressures. The need to seal the furnace prevents purging or other removal of low permeability gases. The high concentration of low permeability gases in the process environment leads to incorporation of low permeability gases as voids at high concentrations in the core cane. As a result, when the core cane is redrawn at high temperatures (~1800° C.), voids containing low permeability gases expand and result in foaming of the preform and a deterioration in optical quality. Similar or even higher processing temperatures arise when drawing fibers from preforms. The presence of voids containing low permeability gases thus leads to foaming of core canes, preforms and optical fibers.

It is therefore desirable to develop an optical fiber preform having a silica core with high halogen doping that is highly transparent and essentially free of gas-phase voids.

SUMMARY

Preparation of silica glass with a high halogen doping concentration and a low density of gas-phase voids is described. The halogen-doped silica glass can be used for preforms or core canes in the manufacture of optical fibers. The preparation includes doping a silica soot body with a gas-phase halogen doping precursor maintained at a high partial pressure to achieve a high halogen doping concentration and sintering the halogen-doped silica soot body to a closed pore state in the presence of the halogen doping precursor to further increase the halogen doping concentration. The partial pressure of other gases in the high-pressure process environment is kept low by purging to prevent incorporation and trapping of gases in the preform as pores close. The closed-pore body formed by the preparation includes a low density of gas-phase voids and a low concentration of internally trapped gases. In a preferred embodiment, the gases excluded from voids and interior of the closed-pore body are impermeable gases. Core canes or fibers drawn from halogen-doped silica prepared from the process disclosed herein show improved optical quality and possess fewer defects.

The present disclosure extends to:
A method of processing a silica soot body comprising:
sintering a silica soot body at a temperature greater than 1100° C. in a first gas environment, said first gas environment comprising a gas-phase halogen doping precursor and a first insoluble gas, said gas-phase halogen doping precursor having a partial pressure greater than 2.0 atm and said first insoluble gas having a partial pressure less than 0.2 atm.

The present disclosure extends to:
A method of processing a silica soot body comprising:
sintering a silica soot body at a temperature greater than 1100° C. in a first gas environment, said first gas environment comprising a gas-phase halogen doping precursor and a first impermeable gas, said gas-phase halogen doping precursor having a partial pressure greater than 2.0 atm;
introducing a purge gas at a first mass flow rate to said first gas environment; and
removing said purge gas at a second mass flow rate from said first gas environment.

The present disclosure extends to:
A method of processing a silica soot body comprising:
sintering a silica soot body at a temperature greater than 1100° C. in a gas environment, said gas environment comprising one or impermeable gases, said one or more impermeable gas having a first partial pressure in said gas phase environment, said first partial pressure being greater than 0.2 atm; and
reducing the partial pressure of said one or more impermeable gases in said gas phase environment to a second partial pressure, said second partial pressure being less than 0.2 atm.

The present disclosure extends to:
A closed-pore silica body comprising a halogen, said closed-pore silica body having a concentration of insoluble gases less than 600 ppb by volume.

The present disclosure extends to glasses made from the methods disclosed herein.

The present disclosure extends to halogen-doped silica made from the methods disclosed herein.

The present disclosure extends to optical fibers comprising glasses made from the methods disclosed herein.

The present disclosure extends to optical fibers comprising halogen-doped silica made from products of the methods disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

Figure 1:
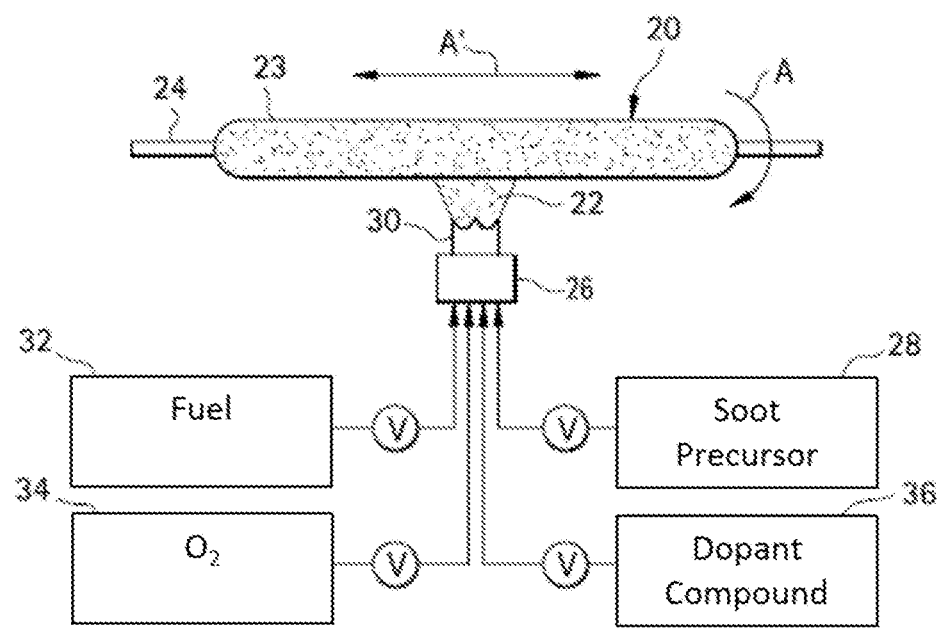
FIG. 1 is a schematic depiction of soot preform deposition via an OVD process.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to terms which shall be defined to have the following meanings:

"Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "updopant" refers to an index-raising dopant and the term "downdopant" refers to an index-lowering dopant. When an updopant is incorporated into a base material, the refractive index of the doped material is higher than the refractive index of the base material. Updoped silica, for example, has a higher refractive index than undoped silica. When a downdopant is incorporated into a base material, the refractive index of the doped material is lower than the refractive index of the base material. Downdoped silica, for example, has a lower refractive index than undoped silica. Updopants for silica include Cl and Ge. Downdopants for silica include B and F. Silica doped with an updopant is referred to as "updoped silica" and silica doped with a downdopant is referred to as "downdoped silica". The process of incorporating an updopant into a base composition is referred to as "updoping" and the process of incorporating a downdopant into a base composition is referred to as "downdoping".

The term "density" of a body refers to the average density of a body.

The term "gas-phase void" refers to an internal gas-filled region that has a longest linear dimension greater than 10 µm within a body.

The term "partial pressure" refers to the pressure of one gas-phase component in a gas-phase environment or to the pressure of a subset of more than one and less than all components in a gas-phase environment.

The term "total pressure" refers to the pressure of all components of a gas-phase environment. Total pressure is the sum of the partial pressures of all components in the gas-phase environment.

Reference will now be made in detail to illustrative embodiments of the present description.

In a continuous optical fiber manufacturing process, an optical fiber is drawn from a heated preform positioned in a draw furnace. After drawing from the preform, the fiber is passed through a series of processing stages. Processing stages typically include metrology units (e.g. fiber diameter control) to assess quality and other characteristics of the optical fiber, heating stages, a primary coating stage, a secondary coating stage, an ink layer stage, and a spool or other winding stage to receive and store the coated optical fiber.

The properties of the optical fiber are determined to a large degree by the characteristics of the preform. The preform is a dense glass monolith with a diameter of about 27 cm and a length of about 200 cm. The preform includes a central core region surrounded by an annular cladding region. The composition of the core and cladding regions of the preform correspond to the compositions of the core and cladding regions of an optical fiber drawn from the preform. The core is typically silica doped with an updopant and the cladding is typically undoped silica or silica doped with a downdopant. The diameter of the core region of the preform and the thickness of the cladding region of the preform are in proportion to the core diameter and cladding thickness of a fiber drawn from the preform. For single-mode fiber, the core diameter is typically ~10 µm and the cladding thickness is typically ~50 µm. The core region and/or cladding region of the preform may include multiple concentric layers that differ in dopant type or dopant concentration to provide optical fibers having a desired refractive index profile. Examples include a cladding region with an inner cladding region, trench region, and/or an outer cladding region.

Silica and doped silica for the core and cladding regions of an optical fiber preform can be produced by methods known in the art. Suitable methods include: flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot methods, and doped deposited silica processes. A variety of CVD (chemical vapor deposition) and plasma-enhanced CVD processes are known and are suitable for producing silica or doped silica.

Formation of silica occurs through reaction or decomposition of a silica precursor. Suitable precursors for silica include OMCTS (octamethylcyclotetrasiloxane) and $SiCl_4$. Doping is accomplished with a doping precursor. The doping precursor can be introduced with the silica precursor in the deposition process or used to treat a porous body formed from a silica precursor. Preferred doping precursors include halogen-containing gases. Suitable precursors for doping silica with bromine include $SiBr_4$. Suitable precursors for doping silica with chlorine include $Cl_2$, $SiCl_4$, $Si_2Cl_6$, $Si_2OCl_6$, and $CCl_4$. Suitable precursors for doping silica with fluorine include $F_2$, $CF_4$, and $SiF_4$. The silica precursor and/or doping precursor is preferably provided as a gas to the deposition process. The gas-phase silica precursor or gas-phase doping precursor is supplied neat (undiluted) or in combination with a diluent gas (e.g. He, $N_2$, Ar).

Figure 2:
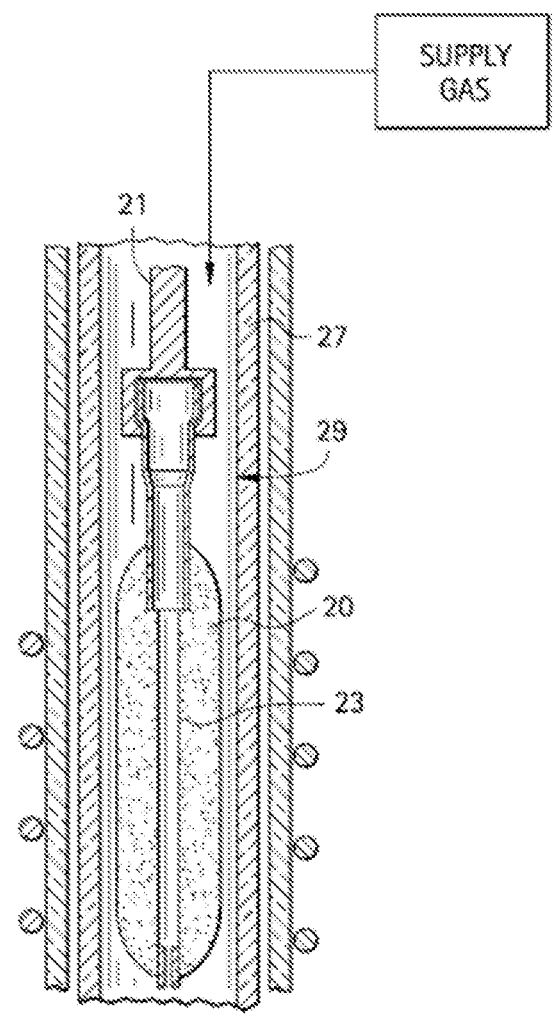
FIG. 2 depicts an apparatus for doping and consolidating a soot preform.

By way of illustration and not intended to be limiting, formation of silica or doped silica via formation of a silica soot body according to the OVD method is illustrated in FIGS. 1 and 2. In FIG. 1, silica soot body 20 is formed by depositing silica-containing soot 22 onto the outer surface of a rotating and translating mandrel 24. Mandrel 24 is preferably tapered. The soot 22 for silica soot body 20 is formed by providing a soot precursor 28 in gaseous form to the flame 30 of a burner 26 to oxidize, hydrolyze, combust, or otherwise react or decompose it. Fuel 32, such as methane ($CH_4$), and a combustion supporting gas 34, such as oxygen, are provided to the burner 26 and ignited to form the flame 30. Mass flow controllers, labelled V, meter the appropriate amounts of soot precursor 28, fuel 32 and combustion supporting gas 34, all preferably in gaseous form, to the burner 26. The soot precursor 28 is a glass former compound (e.g. silica precursor) and is oxidized in the flame 30 to form a generally cylindrically-shaped soot region 23. A soot body comprising silica (doped or undoped) is referred to herein as a silica soot body.

After forming the silica soot body, as illustrated in FIG. 2, the silica soot body 20 is doped (e.g. with bromine, chlorine, fluorine) and sintered in furnace 29 to form a densified glass. Prior to sintering, the bait rod 24 illustrated in FIG. 1 is removed to form a hollow, cylindrical silica soot body. During the doping and sintering processes, the silica soot body 20 is suspended, for example, inside a pure quartz muffle tube 27 of the furnace 29 by a holding mechanism 21. Prior to or during sintering, the silica soot body 20 is optionally exposed to a doping precursor. The doping precursor is preferably provided in gas-phase form and is supplied directly to silica soot body 20 before or during sintering. In one embodiment, the gas-phase doping precursor is a vapor formed by heating or evaporating a liquid precursor. The gas-phase doping precursor is supplied neat (undiluted) or in combination with a diluent gas. The doping concentration of silica soot body 20 can be controlled by controlling, without limitation, the temperature of doping, the temperature of vaporization of a liquid doping precursor, the pressure or partial pressure of a gas-phase doping precursor in the processing ambient of the silica soot body during doping, the time of doping, the number of doping cycles, and the porosity or surface area of the silica soot body (high porosity and/or high surface area promote higher doping concentrations).

Figure 3:
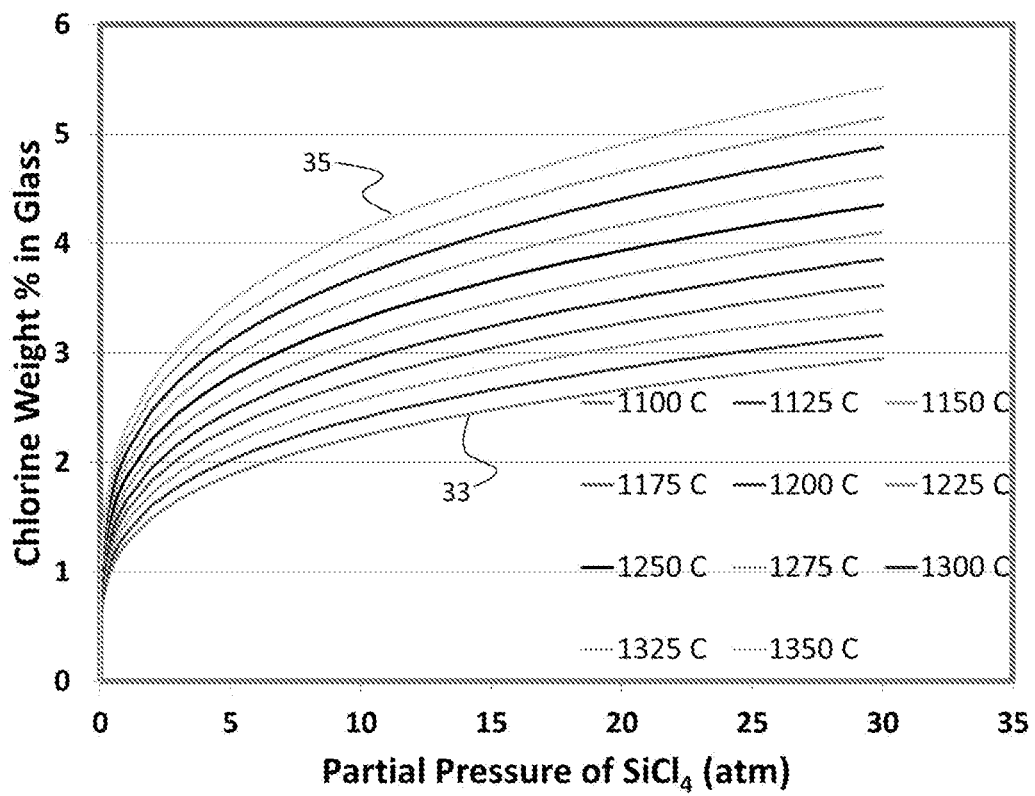
FIG. 3 shows the Cl dopant concentration in silica glass under various doping conditions in an OVD process.

FIG. 3 shows the Cl dopant concentration in silica made using the gas-phase doping precursor $SiCl_4$. The Cl concentration corresponds to the theoretical equilibrium concentration in silica after sintering the silica soot body to a closed-pore state and is shown as a function of the partial pressure of the gas-phase doping precursor $SiCl_4$ for various doping temperatures ranging from 1100° C. (reference numeral 33) to 1350° C. (reference numeral 35) in increments of 25° C. (traces in ascending order from 1100° C. to 1300° C.). Depending on the doping temperature and partial pressure of $SiCl_4$, Cl concentrations in silica up to about 5.25 wt % are shown in FIG. 3. Extrapolation of the data shown in FIG. 3 indicates that higher concentrations of Cl are possible for partial pressures of $SiCl_4$ above 30 atmospheres (atm). The preferred Cl concentration in preforms (core preform, cladding preform, or combination thereof) or closed-pore bodies made from silica is at least 2.5 wt %, or at least 3.0 wt %, or at least 3.5 wt %, or at least 4.0 wt %, or at least 4.5 wt %, or at least 5.0 wt %, or at least 5.5 wt %, or at least 6.0 wt %, or at least 6.5 wt %, or in the range from 2.5 wt %-8.0 wt %, or in the range from 3.0 wt %-7.5 wt %, or in the range from 3.5 wt %-7.0 wt %, or in the range from 4.0 wt %-6.5 wt %, or in the range from 4.5 wt %-6.0 wt %.

In some embodiments, the partial pressure of $SiCl_4$ at which chlorine doping is performed is greater than 30 atmospheres. In other embodiments, the partial pressure of $SiCl_4$ at which chlorine doping is performed is greater than 40 atmospheres. In still other embodiments, the partial pressure of $SiCl_4$ at which chlorine doping is performed is greater than 45 atmospheres. In some embodiments, the Cl concentration in the preform is greater than 5 wt %. In other embodiments, the Cl concentration in the preform is greater than 6 wt %. In still other embodiments, the Cl concentration in the preform is greater than 6.5 wt %.

Figure 4:
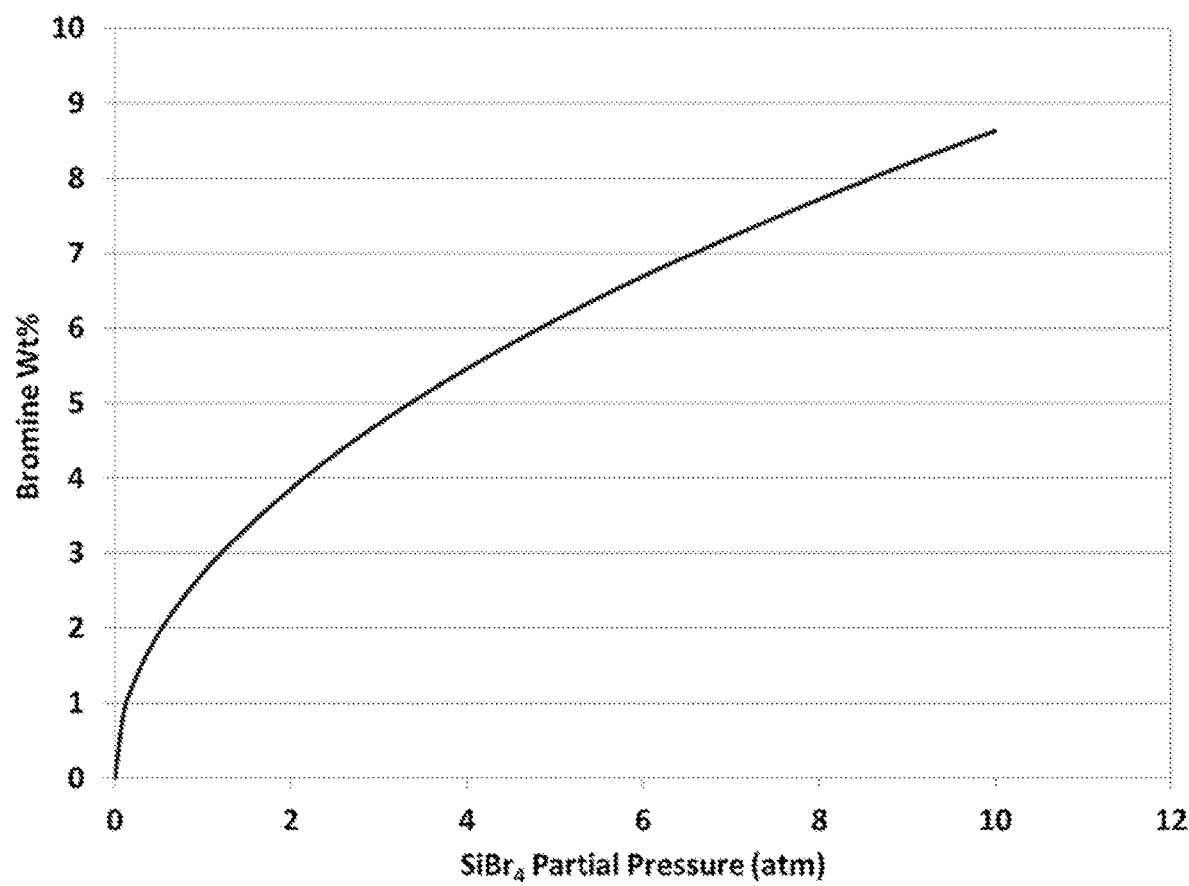
FIG. 4 shows the Br dopant concentration in silica glass under various doping conditions in an OVD process.

FIG. 4 shows the Br dopant concentration in silica made by an OVD process using the gas-phase doping precursor $SiBr_4$. A downdrive process was used for $SiBr_4$ doping. The Br concentration corresponds to the concentration in silica after sintering the silica soot body to a closed-pore state and is shown as a function of the partial pressure of the doping precursor $SiBr_4$ for a doping temperature near the temperature at which the closed-pore state is achieved (approximately 1330° C.). Doping concentrations up to 8.5 wt % Br in silica are achievable at partial pressures of $SiBr_4$ up to 10 atm. The data trend shown in FIG. 4 indicates that doping concentrations above 8.5 wt % are expected when the partial pressure of $SiBr_4$ is greater than 10 atm. The preferred Br concentration in preforms (core preform, cladding preform, or combination thereof) or closed-pore bodies made from silica is at least 2.0 wt %, or at least 2.5 wt %, or at least 3.0 wt %, or at least 3.5 wt %, or at least 4.0 wt %, or at least 4.5 wt %, or at least 5.0 wt %, or at least 5.5 wt %, or in the range from 2.0 wt %-6.0 wt %, or in the range from 2.5 wt %-5.5 wt %, or in the range from 3.0 wt %-5.0 wt %, or in the range from 2.5 wt %-4.5 wt %.

During or after the doping step, the silica soot body is sintered to densify the silica soot body to form a closed-pore body. Sintering occurs at temperatures in the range from 1100° C. to 1600° C. and includes heating at temperatures greater than 1100° C., or greater than 1200° C., or greater than 1300° C., or in the range from 1100° C.-1600° C., or in the range from 1200° C.-1500° C. In some instances, sintering is an isothermal process and in other instances, sintering occurs at a series of different temperatures. In other prior art processes, sintering is a downdrive process in which a sintering front is established by localized heating and the gas-phase doping precursor is provided at the sintering front at a concentration (neat or in combination with a diluent) sufficient to accommodate the equilibrium solubility. Depending on the size of the silica soot body, the thermal conductivity of the silica soot body, and the heating (downdrive) rate of the silica soot body, the sintering front may include a radial temperature gradient. That is, at the sinter front, the outer surface of the silica soot body is exposed to high temperatures and heated, and heating of the interior portion follows in time as heat transfers from the outer surface to the interior of the silica soot body. Sintering at a sufficiently high temperature for a sufficiently long period of time increases the density of the silica soot body and transforms the silica soot body to a closed-pore state.

The OVD method described above can also be used to form a core soot body or a cladding soot body from a silica precursor and a doping precursor as well as a closed-pore state for a core soot body or a cladding soot body. Multilayer core soot bodies and multilayer cladding soot bodies can be obtained by varying the doping conditions during soot deposition. Doping conditions include time of doping, doping precursor, temperature of doping, and pressure of doping. Layers that differ in thickness, dopant type, and doping concentration can be deposited concentrically when forming a core soot body or a cladding soot body.

An optical fiber preform is glass that includes a core region surrounded by a cladding region. Various methods for forming an optical fiber preform are known. In the OVD method described above, for example, one or more concentric core soot layers can be formed, one or more concentric cladding soot layers can be formed on the outermost of the one or more concentric core layers, and the resulting soot body can be sintered to a closed-pore state to provide a preform with a central core region surrounded by an annular cladding region.

In another method, a core soot body is formed, the core soot body is sintered to a closed-pore state, one or more concentric layers of cladding soot are deposited on the closed-pore core body, and the one or more concentric layers of cladding soot are sintered to a closed-pore state to provide a preform with a central core region surrounded by an annular cladding region.

In a further method, a core soot body is formed and sintered to a closed-pore state. A cladding soot body or a closed-pore cladding body is formed independent of the closed-pore core body. The closed-pore core body is then integrated with the cladding soot body or closed-pore cladding body and consolidated to provide a preform with a central core region surrounded by an annular cladding region. By way of example, a cladding soot body (with one or more layers of one or more compositions) can be formed by soot deposition on a mandrel. Upon completion of soot deposition, the mandrel is removed to provide an annular cladding soot body with a central cavity. A closed-pore core body is then inserted in the central cavity and the resulting assembly is sintered to densify the soot cladding to a closed-pore state to form a preform with a central core region surrounded by an annular cladding region.

During preform fabrication or optical fiber manufacture, it is often necessary to heat closed-pore bodies to temperatures above the temperature range of sintering. Drawing a fiber from a preform, for example, typically requires heating the preform to temperatures of ~1800° C. to soften it so that a fiber can be pulled from the preform. As a second example, formation of a preform from a closed-pore core body often requires sizing the closed-pore core body to a specified diameter. From a process economics standpoint, it is preferable to form a large diameter closed-pore core body and to then reduce the dimensions of the closed-pore core body to a selected diameter. After diameter reduction, the closed-pore core body can be cut to a desired length to form a core cane. The core cane can be used as a substrate for deposition of one or more layers of cladding soot or integrated with a cladding soot body or closed-pore cladding body as described above to form a preform. The process of forming a core cane from a closed-pore core body requires heating the closed-pore core body to a temperature of 1800° C. to soften it so that it can be pulled and thinned to a specified diameter. The process of forming a core cane from a closed-pore core body is referred to herein as a "redraw process" or "redrawing".

Drawing fibers from preforms having a closed-pore core region and a closed-pore cladding region and redrawing closed-pore core bodies to form core canes leads to degradation in the closed-pore region or closed-pore body when the closed-pore region or closed-pore body is made from silica with a high halogen doping concentration. Without wishing to be bound by theory, it is believed that the degradation observed during the heating needed for drawing fibers or redrawing core canes leads to evolution (e.g. evaporation, exsolution, or other release from the closed-pore structure) or migration (e.g. diffusion or other motion within the closed-pore structure) of gases trapped in the closed-pore structure and that such evolution or migration leads to formation of gas-phase voids in the closed-pore structure. The presence of gas-phase voids in a preform leads to formation of defects in optical fibers drawn from the preform.

The following discussion describes thermal degradation of closed-pore bodies in the context of redrawing closed-pore core bodies to form core canes for Cl-doped silica prepared using $SiCl_4$ as a doping precursor. It should be understood, however, that the discussion applies analogously to closed-pore bodies generally, including closed-pore core bodies and closed-pore cladding bodies as well as to closed-pore core and closed-pore cladding regions of a fiber preform. The discussion further applies to halogen dopants other than Cl and to halogen doping precursors other than $SiCl_4$.

Figure 5:
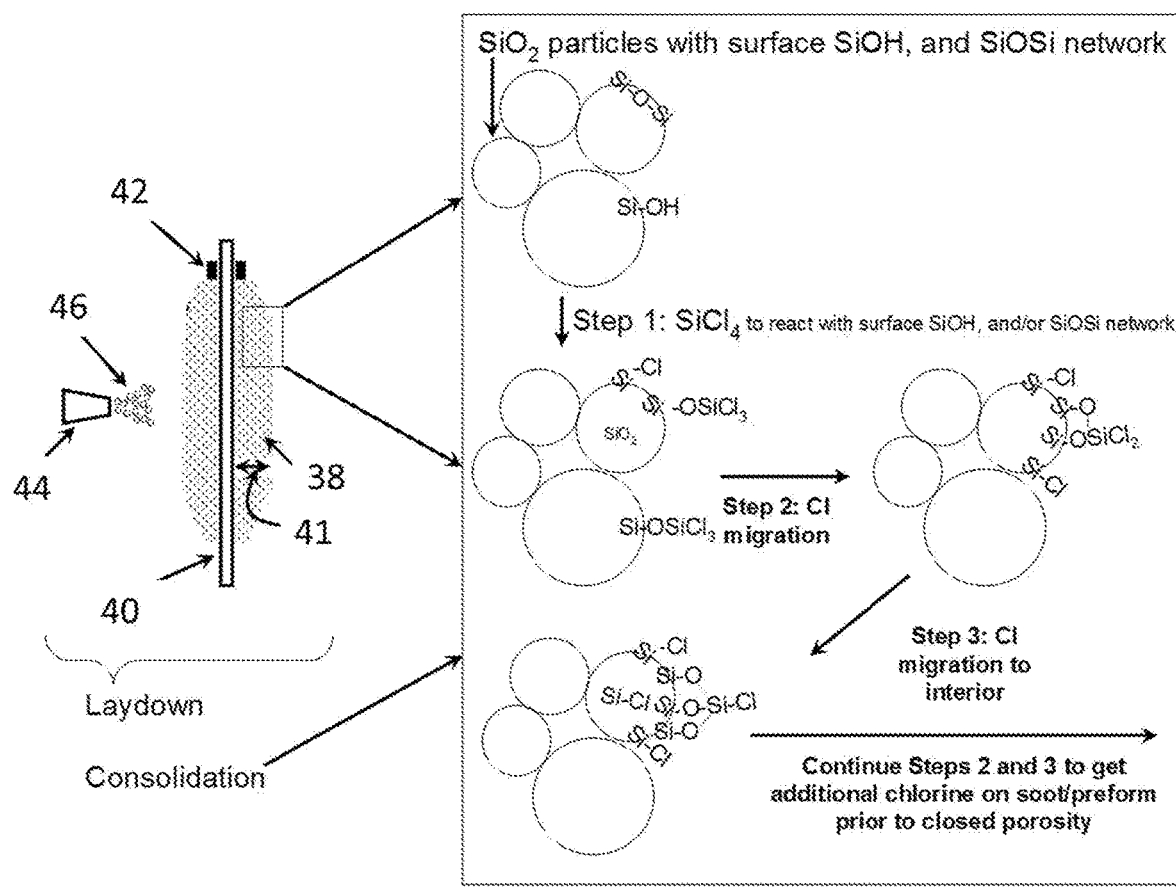
FIG. 5 depicts evolution of the structure of a silica soot body during doping with Cl.

FIG. 5 illustrates the process of doping a core silica soot body formed by an OVD process with Cl using $SiCl_4$ as a doping precursor. Core silica soot body 38 is formed on removable mandrel 40, which is held by handle 42, via deposition of silica soot particles 46 produced from a silica precursor combusted by burner 44. Core silica soot body 38 has thickness 41. The right side of FIG. 5 shows an enlargement of core silica soot body 38 and the evolution of structure during Cl doping. Core silica soot body 38 is a porous (open pore) silica body and doping occurs by exposing core silica soot body 38 to gas-phase $SiCl_4$. In a first step of the doping process, the $SiCl_4$ reacts with Si—OH and Si—O—Si groups on the surface of the core silica soot body to form Si—Cl and Si—O—$SiCl_3$ bonds on the surface. As doping proceeds, additional Cl bonds form on the surface and Cl migrates along the surface to produce a higher concentration and more uniform coverage of the surface with Cl. At later times in the doping process, Cl migrates from the surface to the interior of the core silica soot body. The process is continued by providing a fresh supply of $SiCl_4$ and controlling the doping conditions to achieve a desired doping concentration. Doping is preferably completed while the core silica soot body remains in an open-pore state.

As pores close during sintering, the core silica soot body transforms from an open-pore state to a closed-pore state. In the open-pore state, continuous channels exist within the structure of the core silica soot body and the doping precursor distributes throughout the structure of the core silica soot body. As pores close during sintering, the channels narrow and seal to form a series of discrete, non-continuous voids as the closed-pore structure is produced. Due to the high viscosity of silica, a portion of the gas-phase $SiCl_4$ doping precursor gets encapsulated in unreacted form in the structure and becomes trapped in voids or interstitial regions of the closed-pore structure. It is believed that evolution of trapped unreacted $SiCl_4$ at the high temperatures encountered during subsequent redrawing or drawing processes leads to degradation of the closed-pore core silica body.

In addition to unreacted gas-phase doping precursors, other gases can become entrapped and form gas-phase voids in the core silica soot body as it transforms to a closed-pore state during sintering. Other gases include process gases, byproduct gases, and impurity gases. The gases present in the processing environment of a silica soot body depend on the conditions and precursors used to form the silica soot body. Representative gases present in the process environment include one or more of He, Ne, Ar, Kr, Xe, $Cl_2$, $Br_2$, $O_2$, $SO_2$, $N_2$, CO, $CO_2$, and HCl.

To minimize the concentration of gas-phase voids in closed-pore silica bodies, it is necessary to drive reaction of gas-phase doping precursors as close to completion as possible and to efficiently remove trapped gases. Heating can promote reaction of unreacted doping precursors with surrounding silica (see, for example, FIG. 5) to deplete the concentration of unreacted doping precursors and reduce the contribution of unreacted doping precursors to gas-phase voids. Complete reaction of doping precursors (or other gases capable of reacting with the surrounding silica) may not be achievable under practical reaction conditions and many gases present in the process environment are unreactive with silica.

The present disclosure provides a method to reduce or eliminate gas-phase voids in closed-pore bodies and thus to reduce or eliminate defects that occur when drawing fibers from or redrawing closed-pore bodies. The closed-pore body preferably comprises silica glass, more preferably comprises doped silica glass, and most preferably comprises halogen-doped silica glass. The method recognizes that the presence of gas-phase voids in closed-pore bodies leads to foaming, void enlargement, other degradation, and defects upon heating, drawing or redrawing. The present method is directed to reducing the size and/or concentration of gas-phase voids in closed-pore bodies.

The present method includes doping a silica soot body with a high concentration of halogen and sintering the doped silica soot body to a closed-pore state. A silica soot body is formed, doped, and sintered to a closed-pore state. Transformation of the silica soot body from its initial state upon deposition to a closed-pore state is accompanied by a progressive increase in density. In the initial state formed upon deposition, the density of the silica soot body is in the range from 0.25 $g/cm^3$-1.00 $g/cm^3$. The structure of the silica soot body in the initial state is highly porous with continuous channels and a significant pore volume. Sintering induces a reduction in pore volume and an increase in the density of the silica soot body. Sintering continues until a closed-pore state is reached. As used herein, a closed-pore state of silica is a state having a density of at least 1.90 $g/cm^3$. A body in a closed-pore state is referred to herein as a closed-pore body. Silica in a closed-pore state is referred to herein as closed-pore silica or a closed-pore silica body. Intermediate states between the initial state and closed-pore state are referred to herein as partially consolidated states. Partially consolidated states have a density intermediate between the density of the initial state of the silica soot body and the minimum density of the closed-pore state of silica (1.90 $g/cm^3$). For example, a partially consolidated state has a density greater than 0.50 $g/cm^3$, or greater than 0.75 $g/cm^3$, or greater than 1.00 $g/cm^3$, or greater than 1.25 $g/cm^3$, or greater than 1.50 $g/cm^3$, or greater than 1.75 $g/cm^3$, or in the range from 0.50 $g/cm^3$-1.89 $g/cm^3$, or in the range from 0.80 $g/cm^3$-1.89 $g/cm^3$, or in the range from 1.05 $g/cm^3$-1.89 $g/cm^3$, or in the range from 1.25 $g/cm^3$-1.89 $g/cm^3$, or in the range from 1.50 $g/cm^3$-1.89 $g/cm^3$. Partially consolidated states have a porosity intermediate between the porosity of the initial state and the porosity of the closed-pore state. A soot body in a partially consolidated state is referred to as a partially consolidated soot body. Silica in a partially consolidated state is referred to herein as a partially consolidated silica soot body. An open-pore state is the initial state or a partially consolidated state.

Doping is accomplished by exposing the silica soot body to a gas-phase doping precursor in a gas-phase doping environment. Doping occurs when the silica soot body is in its initial state or a partially consolidated state. In one embodiment, doping commences while the silica soot body is in its initial state and continues as the silica soot body is transformed to a partially consolidated state. In another embodiment, doping commences while the silica soot body is in a partially consolidated state and continues as the silica soot body is transformed to a denser partially consolidated state. The porosity of open-pore states facilitates distribution of the gas-phase doping precursor throughout the silica soot body and promotes greater uniformity in doping. Doping ceases while the silica soot body is in an open-pore state.

The gas-phase doping precursor is preferably a gas-phase halogen doping precursor. Gas-phase halogen doping precursors include $Cl_2$, $SiCl_4$, $Si_2Cl_6$, $Si_2OCl_6$, $CCl_4$, $SiBr_4$, $Br_2$, HBr, $F_2$, $CF_4$, $C_2F_6$, $SF_6$, and $SiF_4$. Doping with the gas-phase halogen doping precursor occurs with or without a diluent gas. Diluent gases include He, Ne, Ar, Kr, Xe, $O_2$, $SO_2$, $N_2$, CO, $CO_2$, and combinations thereof. The concentration of the gas-phase halogen doping precursor in the gas-phase doping environment is expressed herein as a partial pressure. When the gas-phase halogen doping precursor is supplied without a diluent gas, the partial pressure of the gas-phase halogen doping precursor corresponds to the pressure of the gas-phase halogen doping precursor.

To achieve high halogen doping concentration, it is preferable to complete doping in a gas-phase environment that includes a high partial pressure of the gas-phase halogen doping precursor. The partial pressure of a gas-phase halogen doping precursor in the gas-phase doping environment of a silica soot body is preferably at least 1.0 atm, or at least 2.0 atm, or at least 5.0 atm, or at least 10.0 atm, or at least 20.0 atm, or at least 30.0 atm, or at least 40.0 atm, or at least 50.0 atm, or in the range from 1.0 atm-60.0 atm, or in the range from 2.0 atm-50.0 atm, or in the range from 3.0 atm-40.0 atm, or in the range from 5.0 atm-30.0 atm. The temperature of doping is in the range from 800° C.-1500° C., or in the range from 1000° C.-1500° C., or in the range from 1100° C.-1400° C. The time of doping is in the range from 5 min-360 min, or in the range from 15 min-300 min, or in the range from 30 min-240 min, or in the range from 60 min-180 min.

In the course of the present disclosure, it has been determined that certain gases are difficult to remove from porous silica soot as it evolves from an open-pore state to a closed-pore state during sintering. These gases tend to remain as voids in the closed-pore body formed by sintering. For purposes of the present disclosure, sintering refers to heating an open-pore soot body to a temperature of 1100° C. or higher. Typical sintering temperatures are in the range from 1100° C.-1600° C. Heating at temperatures within the sintering range leads to appreciable pore collapse, densification, and ultimately to formation of a closed-pore state.

In one aspect, it has been determined that gases that are impermeable in partially consolidated and closed-pore silica bodies at temperatures within the sintering range (above 1100° C.; e.g. 1100° C.-1600° C.) are difficult to remove and instead remain as gas-phase voids. Permeable gases diffuse within and out of a silica soot body, or dissolve or otherwise integrate with a silica soot body in a manner that avoids formation of gas-phase voids as the silica soot body evolves toward a closed-pore state. Impermeable gases, in contrast, exhibit little tendency to diffuse, dissolve or otherwise integrate with a silica soot body and tend to remain in the closed-pore state in the form of gas-phase voids.

In another aspect, it has been determined that impermeable gases in partially consolidated and closed-pore silica bodies at temperatures within the sintering range (above 1100° C.; e.g. 1100° C.-1600° C.) are difficult to remove and instead remain as gas-phase voids. Permeability of a gas in a medium is defined in Eq. (1):

$$\chi = SD \quad (1)$$

where $\chi$ is permeability of the gas in the medium, $S$ is solubility of the gas in the medium, and $D$ is the diffusion coefficient of the gas in the medium. Permeability reflects the combined effect solubility and diffusion as mechanisms for reducing or avoiding formation of gas-phase voids. As noted above, solubility refers to dissolution or integration of a gas in a material in a manner other than void formation. Diffusion refers to the mobility of a gas through a material. Gases with high diffusivity (as measured by the diffusion coefficient) have high mobility in the material and can migrate from internal gas-phase voids to the surface of the material for release from the material to the surrounding environment as pores collapse during sintering. Both dissolution and diffusion lead to removal or shrinkage of gas-phase voids. Permeable gases are more easily removed from a partially consolidated or closed-pore silica body and less likely to remain as gas-phase voids in a closed-pore silica body formed by sintering. High permeability results from high solubility and/or high diffusivity of the gas in silica or doped silica.

An effective permeability $\chi_{eff}$ for a gas is defined in Eq. (2):

$$\chi_{eff} = \frac{\chi}{P} = \frac{SD}{P} \quad (2)$$

where $P$ is the pressure of the gas. When the gas is present as a component in a mixture of gases, an effective permeability $\chi_{eff,i}$ is defined in Eq. (3):

$$\chi_{eff,i} = \frac{\chi_i}{y_i P_{Total}} = \frac{S_i D_i}{y_i P_{Total}} \quad (3)$$

where i is an index that identifies the gas as a component in a mixture, $\chi_i$ is the permeability of gas component i in the mixture, $y_i$ is the mole fraction of the gas component i in the mixture, $P_{Total}$ is the total pressure of all gases in the mixture (or the combined pressure of a pre-defined subset of gases in the mixture), and $y_i P_{Total}$ is the partial pressure of gas component i in the mixture (or the partial pressure of gas component i in a pre-defined subset of gases in the mixture). An effective permeability $\chi_{eff}$ for a mixture of gases is the sum of the effective permeabilities $\chi_{eff,i}$ of each component gas i in the mixture and is given by Eq. (4):

$$\chi_{eff} = \sum_{i=1}^{n} \chi_{eff,i} = \sum_{i=1}^{n} \frac{\chi_i}{y_i P_{Total}} \quad (4)$$

where n is the number of gas components in the mixture.

In one embodiment, the summation in Eq. (4) extends over all gas-phase components in a mixture and $P_{Total}$ refers to the total pressure of all gases in the gas-phase mixture. In another embodiment, the summation in Eq. (4) extends over a subset of gas-phase components in a mixture and $P_{Total}$ refers to the combined partial pressures of the subset of gases in the gas-phase mixture. For example, in one embodiment, the summation in Eq. (4) extends over all gas-phase components except gas-phase doping precursors and $P_{Total}$ refers to the combined partial pressures of all gases in the gas-phase mixture exclusive of gas-phase doping precursors. In another embodiment, the summation in Eq. (4) extends over all impermeable gases in a gas-phase mixture and $P_{Total}$ refers to the combined partial pressure of all impermeable gases in the gas-phase mixture.

The solubility, diffusion coefficient and permeability of a gas are temperature and material dependent. Values of solubility, diffusion coefficient and permeability for common gases present in the processing of silica soot bodies are listed in Tables 1-3 for temperatures of 1100° C., 1300° C., and 1450° C.

TABLE 1

Solubility (in units of molecules/cm³-atm)

| Gas | S (1100° C.) | S (1300° C.) | S (1450° C.) |
|---|---|---|---|
| He | 7.27 × 10¹⁶ | 7.27 × 10¹⁶ | 7.27 × 10¹⁶ |
| Ne | 9.80 × 10¹⁶ | 9.12 × 10¹⁶ | 8.74 × 10¹⁶ |
| Ar | 1.37 × 10¹⁷ | 1.51 × 10¹⁷ | 1.60 × 10¹⁷ |
| Kr | <1.0 × 10¹⁶ | <1.0 × 10¹⁶ | <1.0 × 10¹⁶ |
| H₂ | 1.51 × 10¹⁷ | 1.40 × 10¹⁷ | 1.34 × 10¹⁷ |
| D₂ | 1.89 × 10¹⁷ | 1.77 × 10¹⁷ | 1.71 × 10¹⁷ |
| N₂ | 1.26 × 10¹⁶ | 1.17 × 10¹⁶ | 1.12 × 10¹⁶ |
| O₂ | 4.96 × 10¹⁶ | 3.98 × 10¹⁶ | 3.48 × 10¹⁶ |
| SO₂ | <1.0 × 10¹⁶ | <1.0 × 10¹⁶ | <1.0 × 10¹⁶ |

TABLE 2

Diffusion Coefficient (in units of cm²/s)

| Gas | D (1100° C.) | D (1300° C.) | D (1450° C.) |
|---|---|---|---|
| He | 1.63 × 10⁻⁴ | 2.23 × 10⁻⁴ | 2.70 × 10⁻⁴ |
| Ne | 4.22 × 10⁻⁶ | 7.02 × 10⁻⁶ | 9.52 × 10⁻⁶ |

TABLE 2-continued

Diffusion Coefficient (in units of cm$^2$/s)

| Gas | D (1100° C.) | D (1300° C.) | D (1450° C.) |
|---|---|---|---|
| Ar | $1.08 \times 10^{-9}$ | $3.20 \times 10^{-9}$ | $6.12 \times 10^{-9}$ |
| Kr | $<1.0 \times 10^{-9}$ | $<1.0 \times 10^{-9}$ | $<1.0 \times 10^{-9}$ |
| H$_2$ | $1.25 \times 10^{-5}$ | $2.03 \times 10^{-5}$ | $2.71 \times 10^{-5}$ |
| D$_2$ | $1.07 \times 10^{-5}$ | $1.75 \times 10^{-5}$ | $2.34 \times 10^{-5}$ |
| N$_2$ | $2.60 \times 10^{-9}$ | $1.03 \times 10^{-8}$ | $2.34 \times 10^{-8}$ |
| O$_2$ | $1.45 \times 10^{-8}$ | $5.09 \times 10^{-8}$ | $1.08 \times 10^{-7}$ |
| SO$_2$ | $<1.0 \times 10^{-9}$ | $<1.0 \times 10^{-9}$ | $<1.0 \times 10^{-9}$ |

TABLE 3

Permeability (in units of molecules/cm$^3$-atm-s)

| Gas | $\chi$ (1100° C.) | $\chi$ (1300° C.) | $\chi$ (1450° C.) |
|---|---|---|---|
| He | $1.19 \times 10^{13}$ | $1.50 \times 10^{13}$ | $1.73 \times 10^{13}$ |
| Ne | $4.13 \times 10^{11}$ | $6.40 \times 10^{11}$ | $8.32 \times 10^{11}$ |
| Ar | $1.48 \times 10^{8}$ | $4.83 \times 10^{8}$ | $9.78 \times 10^{8}$ |
| Kr | $2.39 \times 10^{6}$ | $1.92 \times 10^{7}$ | $6.66 \times 10^{7}$ |
| H$_2$ | $1.89 \times 10^{12}$ | $2.85 \times 10^{12}$ | $3.64 \times 10^{12}$ |
| D$_2$ | $2.02 \times 10^{12}$ | $3.10 \times 10^{12}$ | $4.00 \times 10^{12}$ |
| N$_2$ | $3.28 \times 10^{7}$ | $1.21 \times 10^{8}$ | $2.62 \times 10^{8}$ |
| O$_2$ | $7.18 \times 10^{8}$ | $2.02 \times 10^{9}$ | $3.76 \times 10^{9}$ |

Impermeable gases enter the gas-phase environment of the silica soot body, for example, as carrier gases, diluents, byproducts, or impurities. In one aspect, one or more impermeable gases are present in the gas-phase environment of the silica soot body during doping or are produced as byproducts in the gas-phase environment of the silica soot body during doping. In one aspect, the partial pressure of one or a combination of one or more impermeable gases in the gas-phase environment during doping is greater than 0.20 atm, or greater than 0.30 atm, or greater than 0.40 atm, or greater than 0.50 atm. In another aspect, the introduction of gas-phase doping precursor to the gas-phase environment is terminated to conclude doping and/or gas-phase doping precursor is removed from the gas-phase environment after doping to reduce the partial pressure of gas-phase doping precursor in the gas-phase environment before sintering commences. For example, terminating the supply of gas-phase doping precursor or reducing the partial pressure of gas-phase doping precursor occurs at a temperature less than 1100° C., or less than 1000° C., or less than 900° C., or a temperature in the range from 700° C.-1099° C., or a temperature in the range from 800° C.-1099° C. The partial pressure of one or a combination of one or more impermeable gases in the gas-phase environment of the silica soot body before or at commencement of sintering is greater than 0.20 atm, or greater than 0.30 atm, or greater than 0.40 atm, or greater than 0.50 atm, or greater than 0.60 atm.

The present disclosure provides sintering conditions for minimizing the concentration of gas-phase voids and minimizing the concentration of impermeable gases in closed-pore silica bodies. The closed-pore silica body preferably includes halogen-doped silica. The conditions include sintering a silica soot body in a gas-phase atmosphere that includes a high partial pressure of a gas-phase doping precursor and a low partial pressure of impermeable gases. The gas-phase doping precursor is preferably a halogen doping precursor and a high partial pressure of halogen doping precursor promotes high doping concentrations of halogen in the closed-pore silica body formed during sintering. A low partial pressure of impermeable gases minimizes the availability of impermeable gases and reduces encapsulation of impermeable gases in the silica soot body as it transforms to a closed-pore state during sintering. Closed-pore silica bodies having a low concentration of insoluble gases and a low gas-phase void density result.

As used herein, an impermeable gas is a gas having a permeability $\chi$ at 1450° C. that is less than or equal to $3.0 \times 10^{13}$ molecules/s-cm-atm. A permeable gas is a gas having a permeability $\chi$ at 1450° C. that is greater than $3.0 \times 10^{13}$ molecules/s-cm-atm. Impermeable gases include He, Ne, Ar, Kr, Xe, HCl, H$_2$, D$_2$, N$_2$, O$_2$, SO$_2$, CO, and CO$_2$. It has been determined that permeable gases as defined herein are sufficiently dissolved or otherwise incorporated into (or diffused through and out of) partially consolidated and/or closed-pore silica bodies under typical sintering conditions to maintain a size and concentration of gas-phase voids at a sufficiently low level to preserve the optical quality of closed-pore silica bodies, preforms, and fibers drawn from preforms.

The present process includes sintering a silica soot body in a gas-phase environment that includes a high partial pressure of a halogen doping precursor and/or a low partial pressure of impermeable gases. Halogen doping precursors include SiCl$_4$ and SiBr$_4$. The partial pressure of halogen doping precursor in the gas-phase sintering environment is greater than 20.0 atm, or greater than 30.0 atm, or greater than 35.0 atm, or greater than 40.0 atm, or greater than 45.0 atm, or greater than 50.0 atm, or greater than 55.0 atm, or in the range from 20.0 atm-60.0 atm, or in the range from 30.0 atm-60.0 atm, or in the range from 35.0 atm-55.0 atm and/or the partial pressure of impermeable gases in the gas-phase sintering environment is less than 0.20 atm, or less than 0.10 atm, or less than 0.05 atm, or less than 0.01 atm, or less than 0.005 atm, or less than 0.001 atm, or less than $10^{-4}$ atm, or less than $10^{-5}$ atm, or less than $10^{-6}$ atm, or in the range from $10^{-6}$ atm-0.3 atm, or in the range from $10^{-5}$ atm-0.25 atm, or in the range from $10^{-4}$ atm-0.20 atm, or in the range from 0.001 atm-0.10 atm. It is understood that partial pressure of impermeable gases refers to the sum of the partial pressure of all impermeable gases present in the gas-phase sintering environment.

In one aspect, sintering occurs in a gas-phase environment in which the effective permeability of impermeable gases at 1450° C. is greater than $5.0 \times 10^{13}$ molecules/cm-sec-atm$^2$, or greater than $7.5 \times 10^{13}$ molecules/cm-sec-atm$^2$, or greater than $1.0 \times 10^{14}$ molecules/cm-sec-atm$^2$, or greater than $5.0 \times 10^{14}$ molecules/cm-sec-atm$^2$, or greater than $1.0 \times 10^{15}$ molecules/cm-sec-atm$^2$. The effective permeability of impermeable gases is determined from Eq. (4), where the summation extends over all impermeable gas-phase components and excludes soluble gas-phase components, and where $P_{Total}$ corresponds to the combined partial pressure of all impermeable gas-phase components and excludes permeable gas-phase components.

In one aspect, the closed-pore halogen-doped silica bodies formed by the sintering process described herein have a low concentration of impermeable gases. The combined concentration of all impermeable gases in the closed-pore halogen-doped silica body is less than 600 ppb by volume, or less than 300 ppb by volume, or less than 100 ppb by volume, or less than 50 ppb by volume, or less than 10 ppb by volume, or less than 1 ppb by volume, where ppb refers to parts per billion. The concentration of impermeable gases and gas-phase voids in a closed-pore halogen-doped silica body is measured by microscopy followed by image analysis.

In one aspect, the closed-pore halogen-doped silica bodies formed by the sintering process described herein have a low density of gas-phase voids. The density of gas-phase voids in the closed-pore halogen-doped silica body is less than $2.0 \times 10^{-2}$ voids/cm$^3$, or less than $1.0 \times 10^{-2}$ voids/cm$^3$, or less than $1.0 \times 10^{-3}$ voids/cm$^3$, or less than $1.0 \times 10^{-2}$ voids/cm$^3$.

In one aspect, low partial pressure of impermeable gases during sintering can be achieved by purging the process environment in which the silica soot body is sintered with a purge gas to remove impermeable gases from the sintering environment. Purging occurs before sintering, during sintering, or both before and during sintering. Purging preferably occurs after drying. Purging occurs intermittently or continuously. In one embodiment, the purge gas is a permeable gas. In another embodiment, the purge gas is a doping precursor. In a further embodiment, the purge gas is a halogen doping precursor. In other embodiments, the purge gas is a permeable gas other than a doping precursor and is introduced in combination with a doping precursor to the processing environment of the silica soot body.

Purging entails diluting the gas-phase environment of the silica soot body with a purge gas or sweeping a purge gas through the gas-phase environment of the silica soot body. Purging occurs by exposing a silica soot body to a purge gas, either continuously or intermittently. During doping and sintering, the silica soot body is in a furnace. The furnace is equipped with an inlet and outlet for receiving and removing the purge gas. The purge gas is introduced to dilute impermeable gases present in the processing environment and removed. Over time, as the purge gas is continuously or intermittently introduced and removed, the concentration of impermeable gases in the processing environment of the silica soot body decreases.

Purging occurs by delivering a purge gas to a furnace through an inlet and removing the purge gas from the furnace through an outlet. In one embodiment, the purge gas is continuously supplied to the furnace and the mass flow rate of purge gas through the inlet exceeds the mass flow rate of purge gas through the outlet. In this embodiment, introduction of the purge gas contributes to an increase of pressure in the furnace and continual dilution of impermeable gases. In another embodiment, the mass flow rate of purge gas through the inlet is the same as the mass flow rate of the purge gas through the outlet.

Purging occurs at a process temperature of above 500° C., or above 700° C., or above 900° C., or above 1100° C., or above 1200° C., or above 1300° C., or in the range from 500° C.-1600° C., or in the range from 700° C.-1400° C., or in the range from 900° C.-1300° C. The purge temperature is constant or variable over the time of purge.

The partial pressure of the purge gas in the processing environment of the silica soot body is greater than 1.0 atm, or greater than 2.0 atm, or greater than 5.0 atm, or greater than 10.0 atm, or greater than 20.0 atm, or in the range from 1.0 atm-30.0 atm, or in the range from 2.0 atm-25.0 atm, or in the range from 5.0 atm-20.0 atm. The partial pressure of the purge gas is constant or variable over the time of purge. The maximum total pressure of the gas-phase environment of the silica soot body during the purge is referred herein as the peak purge total pressure. The maximum partial pressure of purge gas established in the gas-phase environment of the silica soot body is referred herein as the peak purge partial pressure.

The purge time is greater than 0.5 hr, or greater than 1.0 hr, or greater than 2.0 hr, or greater than 4.0 hr, or greater than 6.0 hr, or in the range from 0.5 hr-10.0 hr, or in the range from 1.0 hr-8.0 hr, or in the range from 2.0 hr-6.0 hr. Some degree of doping and/or sintering of the silica soot body may occur during the purge.

Upon elapse of the purge time, some or all remaining purge gas in the gas-phase environment of the silica soot body is removed by evacuation or other release. Other gases, including impermeable gases, are also removed. In one embodiment, removal of the purge gas occurs during sintering as the silica soot body approaches a closed-pore state. In this embodiment, removal of purge gas occurs while the silica soot body is in a partially consolidated state having a density less than 1.90 g/cm$^3$, but greater than 1.60 g/cm$^3$, or greater than 1.70 g/cm$^3$, or greater than 1.80 g/cm$^3$.

Removal of the purge gas reduces the pressure of the gas-phase environment of the silica soot body and the partial pressure of purge gas in the gas-phase environment of the silica soot body. The pressure to which the gas-phase environment is reduced at conclusion of the purge is referred to herein as the final purge total pressure. The final purge total pressure is less than 10.0 atm, or less than 5.0 atm, or less than 3.0 atm, or to a pressure in the range from 0.5 atm-10.0 atm, or a pressure in the range from 1.0 atm-5.0 atm. The partial pressure to which purge gas in the gas-phase environment is reduced at conclusion of the purge is referred to herein as the final purge partial pressure. The final purge partial pressure is less than 10.0 atm, or less than 5.0 atm, or less than 3.0 atm, or to a pressure in the range from 0.5 atm-10.0 atm, or a pressure in the range from 1.0 atm-5.0 atm.

The difference between the peak purge total pressure and the final purge total pressure is greater than 1.0 atm, or greater than 2.0 atm, or greater than 5.0 atm, or greater than 10.0 atm, or greater than 15.0 atm, or greater than 20.0 atm, or greater than 25.0 atm, or in the range from 1.0 atm-30.0 atm, or in the range from 2.0 atm-25.0 atm, or in the range from 5.0 atm-20.0 atm.

The difference between the peak purge partial pressure and the final purge partial pressure is greater than 1.0 atm, or greater than 2.0 atm, or greater than 5.0 atm, or greater than 10.0 atm, or greater than 15.0 atm, or greater than 20.0 atm, or greater than 25.0 atm, or in the range from 1.0 atm-30.0 atm, or in the range from 2.0 atm-25.0 atm, or in the range from 5.0 atm-20.0 atm.

After conclusion of the purge, the pressure of the gas-phase environment of the silica soot body is increased above the final purge total pressure. In a preferred embodiment, the pressure is increased by introducing a gas-phase halogen doping precursor to the gas-phase environment of the silica soot body. The gas-phase halogen doping precursor is introduced to increase the pressure of the gas-phase environment of the silica soot body to a pressure greater than 2.0 atm, or greater than 5.0 atm, or greater than 10.0 atm, or greater than 20.0 atm, or greater than 30.0 atm, or greater than 40.0 atm, or greater than 50.0 atm, or a pressure in the range from 2.0 atm-60.0 atm, or a pressure in the range from 5.0 atm-50.0 atm, or a pressure in the range from 10.0 atm-40.0 atm. The partial pressure in the gas-phase environment of the gas-phase halogen doping precursor added after conclusion of the purge is greater than 20.0 atm, or greater than 30.0 atm, or greater than 35.0 atm, or greater than 40.0 atm, or greater than 45.0 atm, or greater than 50.0 atm, or greater than 55.0 atm, or in the range from 20.0 atm-60.0 atm, or in the range from 30.0 atm-60.0 atm, or in the range from 35.0 atm-55.0 atm.

The maximum partial pressure of doping precursor added after conclusion of the purge is referred to herein as peak partial pressure of the doping precursor in the gas-phase environment. The peak partial pressure of the doping precursor is greater than the final purge pressure by at least 2.0 atm, or at least 5.0 atm, or at least 10.0 atm, or at least 20.0 atm, or at least 30.0 atm, or at least 40.0 atm, or at least 50.0 atm, or at least a pressure in the range from 2.0 atm-60.0 atm, or at least a pressure in the range from 5.0 atm-50.0 atm, or at least a pressure in the range from 10.0 atm-40.0 atm.

After conclusion of the purge and increasing the pressure of the gas-phase environment of the silica soot body above the final purge total pressure, the partial pressure of impermeable gases (individually or collectively) in the gas-phase environment is less than 0.20 atm, or less than 0.10 atm, or less than 0.05 atm, or less than 0.01 atm, or less than 0.005 atm, or less than 0.001 atm, or less than $10^{-4}$ atm, or less than $10^{-5}$ atm, or less than $10^{-6}$ atm, or in the range from $10^{-6}$ atm-0.3 atm, or in the range from $10^{-5}$ atm-0.25 atm, or in the range from $10^{-4}$ atm-0.20 atm, or in the range from 0.001 atm-0.10 atm. Each of these conditions corresponds to an embodiment of a gas-phase sintering environment.

In an embodiment, the purge leads to a reduction in the partial pressure of impermeable gases (individually or collectively) in the gas-phase environment of the silica soot body from a partial pressure greater than 0.20 atm, or greater than 0.30 atm, or greater than 0.40 atm, or greater than 0.50 atm, or in the range from 0.20 atm-1.0 atm to a partial pressure less than 0.20 atm, or less than 0.10 atm, or less than 0.05 atm, or less than 0.01 atm, or less than 0.005 atm, or less than 0.001 atm, or less than $10^{-4}$ atm, or less than $10^{-5}$ atm, or less than $10^{-6}$ atm, or in the range from $10^{-6}$ atm-0.3 atm, or in the range from $10^{-5}$ atm-0.25 atm, or in the range from $10^{-4}$ atm-0.20 atm, or in the range from 0.001 atm-0.10 atm.

In an embodiment, the purge leads to an increase in the effective permeability of a plurality of impermeable gases from an effective permeability less than $5.0\times10^{13}$ molecules/cm-sec-atm$^2$, to an effective permeability greater than $5.0\times10^{13}$ molecules/cm-sec-atm$^2$, or greater than $7.5\times10^{13}$ molecules/cm-sec-atm$^2$, or greater than $1.0\times10^{14}$ molecules/cm-sec-atm$^2$, or greater than $5.0\times10^{14}$ molecules/cm-sec-atm$^2$, or greater than $1.0\times10^{15}$ molecules/cm-sec-atm$^2$.

Figure 6:
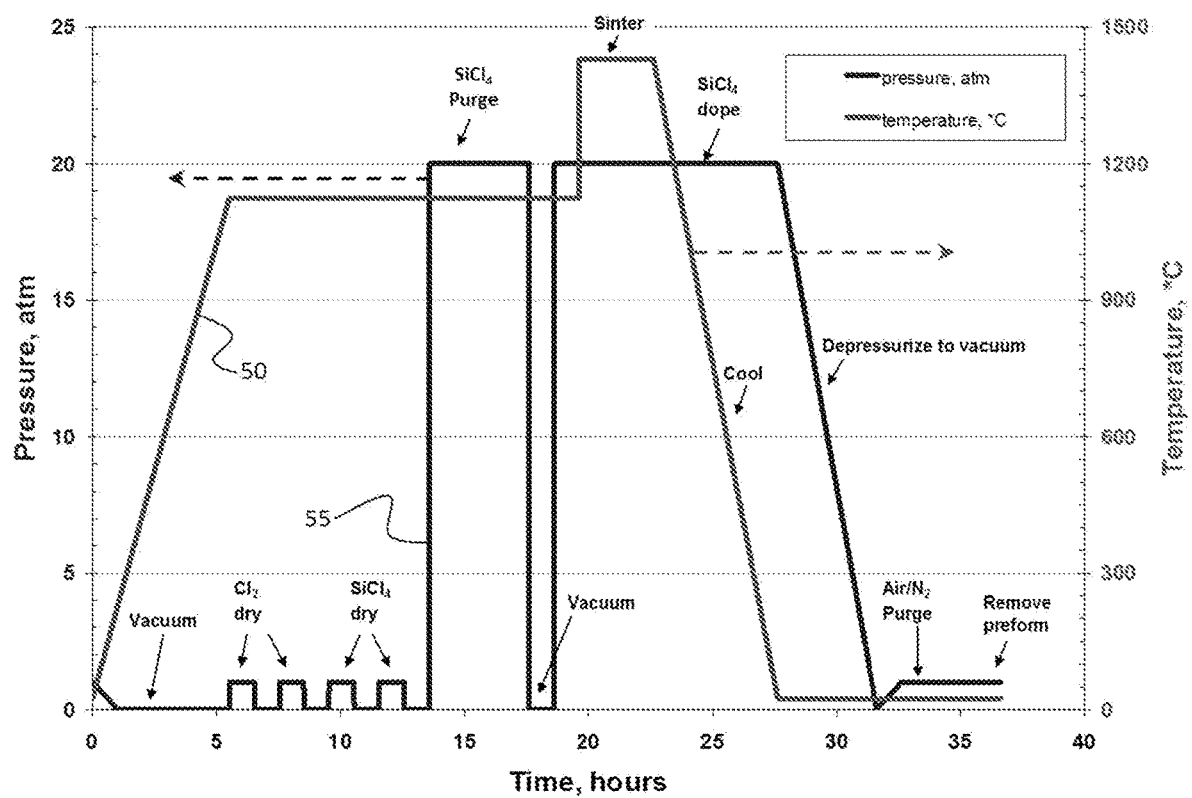
FIG. 6 shows a process cycle for doping and sintering a silica soot body.

A representative process cycle that includes purging is shown in FIG. 6. FIG. 6 depicts the pressure and temperature of the process environment of a silica soot body as a function of process time. Trace 50 shows the process temperature and Trace 55 shows the process pressure, where process temperature corresponds to the furnace temperature and process pressure corresponds to the total pressure of the gas phase surrounding the silica soot body. At the initial state of processing (time=0 hours), the silica soot body is at room temperature and room pressure. The process begins by heating the silica soot body to 1100° C. (Trace 50) and applying vacuum to the process environment (Trace 55). A drying step is performed while maintaining the silica soot body at 1100° C. Drying includes exposing the silica soot body to a drying agent to remove water and hydroxyl groups. Drying agents include $Cl_2$ and $SiCl_4$. A drying agent is introduced to the processing environment (continuously or intermittently) and reacts with the silica soot body to remove water and hydroxyl groups that are bonded to or incorporated within the pores of the silica soot body. Reaction of the drying agent with water and hydroxyl groups can produce impermeable gas byproducts (e.g. $O_2$ or $H_2O$) that are preferably removed from the process environment in a subsequent purge step. In the embodiment shown in FIG. 6, drying includes exposing the silica soot body two cycles of treatment with $Cl_2$ and two cycles of treatment with $SiCl_4$ (Trace 55). The pressure of drying agent in each treatment cycle was approximately 1 atm and the time of each treatment cycle was approximately 1 hour. Some degree of doping and/or sintering may occur during drying.

After drying, the process environment of the silica soot body was purged with $SiCl_4$. $SiCl_4$ was used as a doping precursor and was introduced at a pressure of 20 atm (Trace 55). Purging occurred at 1100° C. for a time of about 4 hours (Trace 55). After the purge, the purge gas ($SiCl_4$) was removed by applying a vacuum to evacuate the process environment of the silica soot body (Trace 55). Some degree of doping and/or sintering may occur during the purge.

After the purge, Cl doping was performed. $SiCl_4$ was used as a doping precursor and was introduced at a pressure of 20 atm (Trace 55). The temperature of doping was initially 1100° C. (Trace 50). After about 1 hr, the temperature was increased to about 1425° C. (Trace 50) to induce sintering while continuing doping (Trace 50 and Trace 55). The silica soot body was maintained at 1425° C. for about 3 hours to form a closed-pore silica body and then gradually cooled to room temperature (Trace 50). The doping precursor ($SiCl_4$) was maintained in the process environment at 20 atm during sintering and cooling. Upon conclusion of cooling to room temperature, the doping precursor ($SiCl_4$) was removed and the process environment was depressurized (Trace 55) and purged with air and $N_2$ (Trace 55). The closed-pore silica body was then removed.

The sintering treatment described herein is effective in reducing the volume and density of gas-phase voids in a closed-pore silica body doped with a halogen, where the concentration of the halogen in the closed-pore silica body is greater than 1.0 wt %, or greater than 1.5 wt %, or greater than 2.0 wt %, or greater than 2.5 wt %, or greater than 3.0 wt %, or greater than 3.5 wt %, or greater than 4.0 wt %, or greater than 4.5 wt %, or greater than 5.0 wt %, or greater than 5.5 wt %, or greater than 6.0 wt %, or greater than 6.5 wt %, or in the range from 1.0 wt %-8.0 wt %, or in the range from 1.5 wt %-7.5 wt %, or in the range from 2.0 wt %-7.0 wt %, or in the range from 2.5 wt %-6.5 wt %, or in the range from 3.0 wt %-6.0 wt %, or in the range from 1.75 wt %-3.25 wt %, or in the range from 2.0 wt %-3.0 wt %.

Aspect 1 of the description is:
A method of processing a silica soot body comprising:
sintering a silica soot body at a temperature greater than 1100° C. in a first gas environment, said first gas environment comprising a gas-phase halogen doping precursor and a first impermeable gas, said gas-phase halogen doping precursor having a partial pressure greater than 2.0 atm and said first impermeable gas having a partial pressure less than 0.2 atm.

Aspect 2 of the description is:
The method of Aspect 1, wherein said sintering occurs at a temperature greater than 1300° C.

Aspect 3 of the description is:
The method of Aspect 1 or 2, wherein said sintering transforms said silica soot body from a first state having a density in the range from 0.25 g/cm$^3$-1.00 g/cm$^3$ to a second state having a density in the range from 1.05 g/cm$^3$-1.89 g/cm$^3$.

Aspect 4 of the description is:
The method of Aspect 1 or 2, wherein said sintering transforms said silica soot body to a closed-pore state.

Aspect 5 of the description is:
The method of any of Aspects 1-4, wherein said gas-phase halogen doping precursor is $SiCl_4$ or $SiBr_4$.

Aspect 6 of the description is:
The method of any of Aspects 1-5, wherein said first impermeable gas is selected from the group consisting of He, Ne, Ar, Kr, $H_2$, $D_2$, $N_2$, $O_2$, CO, $CO_2$, and HCl.

Aspect 7 of the description is:
The method of any of Aspects 1-6, wherein said gas-phase halogen doping precursor has a partial pressure greater than 10.0 atm.

Aspect 8 of the description is:
The method of any of Aspects 1-6, wherein said gas-phase halogen doping precursor has a partial pressure greater than 30.0 atm.

Aspect 9 of the description is:
The method of any of Aspects 1-8, wherein said first impermeable gas has a partial pressure less than 0.05 atm.

Aspect 10 of the description is:
The method of Aspect 9, wherein said gas-phase halogen doping precursor has a partial pressure greater than 5.0 atm.

Aspect 11 of the description is:
The method of Aspect 9, wherein said gas-phase halogen doping precursor has a partial pressure greater than 20.0 atm.

Aspect 12 of the description is:
The method of any of Aspects 1-8, wherein said first impermeable gas has a partial pressure less than 0.01 atm.

Aspect 13 of the description is:
The method of Aspect 12, wherein said gas-phase halogen doping precursor has a partial pressure greater than 5.0 atm.

Aspect 14 of the description is:
The method of Aspect 12, wherein said gas-phase halogen doping precursor has a partial pressure greater than 20.0 atm.

Aspect 15 of the description is:
The method of any of Aspects 1-8, wherein said first impermeable gas has a partial pressure less than 0.001 atm.

Aspect 16 of the description is:
The method of Aspect 15, wherein said gas-phase halogen doping precursor has a partial pressure greater than 5.0 atm.

Aspect 17 of the description is:
The method of Aspect 15, wherein said gas-phase halogen doping precursor has a partial pressure greater than 20.0 atm.

Aspect 18 of the description is:
The method of any of Aspects 1-17, wherein said first gas-phase environment comprises a plurality of impermeable gases, said plurality including said first impermeable gas.

Aspect 19 of the description is:
The method of Aspect 18, wherein said plurality of impermeable gases has an effective permeability at 1450° C. greater than $5.0 \times 10^{13}$ molecules/cm-sec-atm$^2$.

Aspect 20 of the description is:
The method of Aspect 18, wherein said plurality of impermeable gases has an effective permeability at 1450° C. greater than $5.0 \times 10^{14}$ molecules/cm-sec-atm$^2$.

Aspect 21 of the description is:
The method of any of Aspects 18-20, wherein said plurality of impermeable gases has a partial pressure less than 0.20 atm.

Aspect 22 of the description is:
The method of Aspect 21, wherein said gas-phase halogen doping precursor has a partial pressure greater than 5.0 atm.

Aspect 23 of the description is:
The method of Aspect 21, wherein said gas-phase halogen doping precursor has a partial pressure greater than 20.0 atm.

Aspect 24 of the description is:
The method of any of Aspects 18-20, wherein said plurality of impermeable gases has a partial pressure less than 0.01 atm.

Aspect 25 of the description is:
The method of Aspect 24, wherein said gas-phase halogen doping precursor has a partial pressure greater than 5.0 atm.

Aspect 26 of the description is:
The method of Aspect 24, wherein said gas-phase halogen doping precursor has a partial pressure greater than 20.0 atm.

Aspect 27 of the description is:
The method of any of Aspects 18-20, wherein said plurality of impermeable gases has a partial pressure less than 0.001 atm.

Aspect 28 of the description is:
The method of Aspect 27, wherein said gas-phase halogen doping precursor has a partial pressure greater than 5.0 atm.

Aspect 29 of the description is:
The method of Aspect 27, wherein said gas-phase halogen doping precursor has a partial pressure greater than 20.0 atm.

Aspect 30 of the description is:
The method of any of Aspects 1-29, further comprising doping said silica soot body, said doping comprising exposing said silica soot body to a second gas environment at a temperature less than 1100° C., said second gas environment comprising said gas-phase doping precursor.

Aspect 31 of the description is:
The method of Aspect 30, wherein said second gas environment comprises said first impermeable gas, said first impermeable gas having a partial pressure greater than 0.20 atm in said second gas environment.

Aspect 32 of the description is:
The method of Aspect 31, further comprising diluting said second gas environment with a purge gas to form a third gas-phase environment, said diluting reducing the partial pressure of said first impermeable gas to less than 0.20 atm.

Aspect 33 of the description is:
The method of Aspect 32, wherein the purge gas comprises a gas-phase doping precursor.

Aspect 34 of the description is:
The method of Aspect 33, wherein said gas-phase doping precursor is said gas-phase halogen doping precursor.

Aspect 35 of the description is:
The method of Aspect 32, wherein said diluting reduces the partial pressure of said first impermeable gas to less than 0.05 atm in said third gas-phase environment.

Aspect 36 of the description is:
The method of Aspect 32, wherein said diluting reduces the partial pressure of said first impermeable gas to less than 0.01 atm in said third gas-phase environment.

Aspect 37 of the description is:
The method of Aspect 32, wherein said diluting reduces the partial pressure of said first impermeable gas to less than 0.001 atm in said third gas-phase environment.

Aspect 38 of the description is:
The method of Aspect 32, wherein said diluting increases a partial pressure of said purge gas to a peak purge partial pressure greater than 2.0 atm in said third gas-phase environment.

Aspect 39 of the description is:
The method of Aspect 38, wherein said peak purge partial pressure is greater than 5.0 atm in said third gas-phase environment.

Aspect 40 of the description is:
The method of Aspect 38, wherein said peak purge partial pressure is greater than 10.0 atm in said third gas-phase environment.

Aspect 41 of the description is:
The method of Aspect 40, wherein said third gas-phase environment has a total pressure greater than 10.0 atm.

Aspect 42 of the description is:
The method of any of Aspects 32-41, further comprising removing said purge gas from said third gas-phase environment to form a fourth gas-phase environment, said fourth gas-phase environment having a total pressure less than 10.0 atm.

Aspect 43 of the description is:
The method of Aspect 42, further comprising adding a gas-phase doping precursor to said fourth gas-phase environment to form a fifth gas-phase environment, said fifth gas-phase environment having a total pressure greater than 10.0 atm.

Aspect 44 of the description is:
The method of Aspect 43, wherein said fifth gas-phase environment has a total pressure greater than 20.0 atm.

Aspect 45 of the description is:
The method of Aspect 43, wherein said gas-phase doping precursor is said gas-phase halogen doping precursor.

Aspect 46 of the description is:
The method of Aspect 43, wherein said fourth gas-phase environment has a total pressure less than 1.0 atm.

Aspect 47 of the description is:
A method of processing a silica soot body comprising:
sintering a silica soot body at a temperature greater than 1100° C. in a first gas environment, said first gas environment comprising a gas-phase halogen doping precursor and a first impermeable gas, said gas-phase halogen doping precursor having a partial pressure greater than 2.0 atm;
introducing a purge gas at a first mass flow rate to said first gas environment; and
removing said purge gas at a second mass flow rate from said first gas environment.

Aspect 48 of the description is:
The method of Aspect 47, wherein said second mass flow rate is less than said first mass flow rate.

Aspect 49 of the description is:
The method of Aspect 47 or 48, wherein said introducing and removing said purge gas is performed continuously.

Aspect 50 of the description is:
The method of Aspect 47, wherein said gas-phase halogen doping precursor has a partial pressure greater than 10.0 atm.

Aspect 51 of the description is:
The method of any of Aspects 47-50, wherein said gas-phase halogen doping precursor has a partial pressure greater than 20.0 atm.

Aspect 52 of the description is:
The method of any of Aspects 47-50, wherein said gas-phase halogen doping precursor has a partial pressure greater than 40.0 atm.

Aspect 53 of the description is:
The method of any of Aspects 47-52, wherein said silica soot body is in a partially consolidated state.

Aspect 54 of the description is:
The method of Aspect 53, wherein said silica soot body has a density greater than 1.60 g/cm$^3$.

Aspect 55 of the description is:
The method of Aspect 53, wherein said silica soot body has a density greater than 1.80 g/cm$^3$.

Aspect 56 of the description is:
The method of any of Aspects 47-55, further comprising terminating said introducing said purge gas.

Aspect 57 of the description is:
A closed-pore silica body comprising a halogen, said closed-pore silica body having a concentration of impermeable gases less than 600 ppb by volume.

Aspect 58 of the description is:
The closed-pore silica body of Aspect 57, wherein said concentration of impermeable gases is less than 100 ppb by volume.

Aspect 59 of the description is:
The closed-pore silica body of Aspect 57, wherein said concentration of impermeable gases is less than 10 ppb by volume.

Aspect 60 of the description is:
The closed-pore silica body of any of Aspects 57-59, wherein said closed-pore silica body has a density of gas-phase voids less than $2.0 \times 10^{-2}$ voids/cm$^3$.

Aspect 61 of the description is:
The closed-pore silica body of any of Aspects 57-59, wherein said closed-pore silica body has a density of gas-phase voids less than $1.0 \times 10^{-3}$ voids/cm$^3$.

Aspect 62 of the description is:
The closed-pore silica body of any of Aspects 57-61, wherein said closed-pore silica body comprises greater than 2.0 wt % of said halogen.

Aspect 63 of the description is:
The closed-pore silica body of any of Aspects 57-61, wherein said closed-pore silica body comprises greater than 3.5 wt % of said halogen.

Aspect 64 of the description is:
A method of processing a silica soot body comprising:
sintering a silica soot body at a temperature greater than 1100° C. in a gas environment, said gas environment comprising one or impermeable gases, said one or more impermeable gas having a first partial pressure in said gas phase environment, said first partial pressure being greater than 0.2 atm; and
reducing the partial pressure of said one or more impermeable gases in said gas phase environment to a second partial pressure, said second partial pressure being less than 0.2 atm.

Aspect 65 of the description is:
The method of Aspect 64, wherein said first partial pressure is greater than 0.5 atm.

Aspect 66 of the description is:
The method of Aspect 64 or 65, wherein said second partial pressure is less than 0.1 atm.

Aspect 67 of the description is:
The method of Aspect 64 or 65, wherein said second partial pressure is less than 0.01 atm.

Aspect 68 of the description is:
The method of any of Aspects 64-67, wherein said one or more impermeable gases has an effective permeability less than $5.0 \times 10^{13}$ molecules/cm-sec-atm$^2$ and said reducing partial pressure comprises increasing the effective permeability of said one or more impermeable gases to greater than $5.0 \times 10^{13}$ molecules/cm-sec-atm$^2$.

Aspect 69 of the description is:
The method of Aspect 68, wherein said reducing partial pressure comprises increasing the effective permeability of said one or more impermeable gases to greater than $5.0 \times 10^{14}$ molecules/cm-sec-atm$^2$.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

It will be apparent to those skilled in the art that various modifications and variations can be made without departing from the spirit or scope of the illustrated embodiments.

Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. A method of processing a silica soot body comprising: sintering a silica soot body at a temperature greater than 1100° C. in a first gas environment, said first gas environment comprising a gas-phase halogen doping precursor and a plurality of impermeable gases, said plurality including a first impermeable gas, said gas-phase halogen doping precursor having a partial pressure greater than 2.0 atm and said first impermeable gas having a partial pressure less than 0.2 atm.

2. The method of claim 1, wherein said sintering transforms said silica soot body from a first state having a density in the range from 0.25 g/cm$^3$-1.00 g/cm$^3$ to a second state having a density in the range from 1.05 g/cm$^3$-1.89 g/cm$^3$.

3. The method of claim 1, wherein said sintering transforms said silica soot body to a closed-pore state.

4. The method of claim 1, wherein said gas-phase halogen doping precursor is SiCl$_4$ or SiBr$_4$.

5. The method of claim 1, wherein said first impermeable gas is selected from the group consisting of He, Ne, Ar, Kr, H$_2$, D$_2$, N$_2$, O$_2$, CO, CO$_2$, and HCl.

6. The method of claim 1, wherein said gas-phase halogen doping precursor has a partial pressure greater than 10.0 atm.

7. The method of claim 1, wherein said first impermeable gas has a partial pressure less than 0.05 atm.

8. The method of claim 1, wherein said plurality of impermeable gases has an effective permeability at 1450° C. greater than $5.0 \times 10^{13}$ molecules/cm-sec-atm$^2$.

9. The method of claim 1, wherein said plurality of impermeable gases has a partial pressure less than 0.20 atm.

10. A method of processing a silica soot body comprising doping said silica soot body, said doping comprising exposing said silica soot body to a first gas environment at a temperature less than 1100° C., said first gas environment comprising a gas-phase halogen doping precursor and a first impermeable gas, said first impermeable gas having a partial pressure greater than 0.20 atm in said first gas environment; and sintering a silica soot body at a temperature greater than 1100° C. in a second gas environment, said second gas environment comprising said gas-phase halogen doping precursor and said first impermeable gas, said gas-phase halogen doping precursor having a partial pressure greater than 2.0 atm and said first impermeable gas having a partial pressure less than 0.2 atm in said second gas environment.

11. The method of claim 10, further comprising diluting said first gas environment with a purge gas to form a third gas-phase environment, said diluting reducing the partial pressure of said first impermeable gas to less than 0.20 atm.

12. The method of claim 11, wherein said diluting increases a partial pressure of said purge gas to a peak purge partial pressure greater than 2.0 atm in said third gas-phase environment.

13. The method of claim 11, wherein said diluting comprises introducing said purge gas to said first gas phase environment at a first mass flow rate and removing said purge gas from said third gas phase environment at a second mass flow rate, the second mass flow rate less than the first mass flow rate.

* * * * *